(12) United States Patent
Orillo

(10) Patent No.: US 6,360,877 B1
(45) Date of Patent: Mar. 26, 2002

(54) CONVEYORS FOR FEEDING CONTAINERS IN EQUALLY SPACED MANNER

(75) Inventor: Antonio Orillo, Casalecchio Di Reno (IT)

(73) Assignee: I.M.A. Industria Machine Automatiche S.p.A. (IT)

(*) Notice: Subject to any disclaimer, the term of this patent is extended or adjusted under 35 U.S.C. 154(b) by 0 days.

(21) Appl. No.: 09/647,487
(22) PCT Filed: Mar. 17, 1999
(86) PCT No.: PCT/IB99/00454
  § 371 Date: Sep. 29, 2000
  § 102(e) Date: Sep. 29, 2000
(87) PCT Pub. No.: WO99/51515
  PCT Pub. Date: Oct. 14, 1999
(51) Int. Cl.[7] ............................................ B65G 17/46
(52) U.S. Cl. ..................... 198/803.5; 198/697; 198/834
(58) Field of Search ........................... 198/834, 803.13, 198/803.5, 697

(56) References Cited

U.S. PATENT DOCUMENTS

| 1,127,489 A | * | 9/1915 | Morrison ................... 198/697 |
| 2,358,292 A | * | 9/1944 | Malhiot |
| 3,288,271 A | * | 11/1966 | Burford |
| 3,365,051 A | * | 1/1968 | Mullis et al. |
| 4,393,747 A | * | 7/1983 | Gustavsson et al. ........... 89/45 |
| 4,747,747 A | * | 5/1988 | Fusco et al. ................. 414/528 |
| 4,893,707 A | * | 1/1990 | Langen et al. ........... 198/626.3 |
| 5,050,318 A | * | 9/1991 | Bruyn ......................... 34/217 |
| 5,560,473 A | * | 10/1996 | Ivancso, Jr. et al. .... 198/803.11 |
| 5,564,556 A | * | 10/1996 | Spada et al. ........... 198/803.13 |

FOREIGN PATENT DOCUMENTS

EP 0711719 A 5/1996

* cited by examiner

Primary Examiner—Christopher P. Ellis
Assistant Examiner—Richard Ridley
(74) Attorney, Agent, or Firm—William J. Sapone; Coleman, Sudol, Sapone, P.C.

(57) ABSTRACT

In a conveyor including an endless belt (3) that features equispaced recesses made on an outer surface of the belt, the recesses can be set in communication with a vacuum source when they are moving along an upper run of the conveyor, so as to grip a base (50a) of a container located thereon. A pad (15) is provided for each recess and is hinged to the belt right behind the respective recess for receiving in abutment and pushing a rear wall (50b) of the container. A connecting rod (8) is pivoted at the top to the pad and at the bottom to the belt.

4 Claims, 2 Drawing Sheets

CONVEYORS FOR FEEDING CONTAINERS IN EQUALLY SPACED MANNER

FIELD OF THE INVENTION

The claimed invention relates to processing systems, in particular to conveyors used to transfer containers among one or more operative stations.

The conveyor is intended for e.g. sleeve containers, that, in subsequent stations, are closed at bottom, filled, marked with series numbers and then closed at top. The containers are lastly brought away (unloaded) from the conveyors.

DESCRIPTION OF THE PRIOR ART

Conveyors have heretofore been provided, which are formed by an endless belt, whose outer surface is provided with a plurality of equispaced boxes, each of which is defined by two walls fastened crosswise to belt.

When the size is to be changed, it is necessary to adjust the reciprocal distance between the walls, or, in some cases, substitute these walls with other walls of the right size.

Other conveyors have heretofore been provided, which are formed by a group of e.g. four endless chains, arranged side by side and lying on vertical planes.

These chains feature equispaced prongs fastened to their outer surface.

Two prongs of two chains form an abutment for the front wall of the container, which is pushed by two prongs of other two chains, against which the rear wall of this container abuts with suitable pressure.

Consequently, the container remains closed between the two pairs of prongs, front and rear, respectively.

When the container size is to be changed, it is necessary to adjust the timing between the driving wheels of the chains operating the front and rear pairs of prongs.

Still another type of a conveyor has been provided, in which each container is situated between the upper run of a first conveyor and a lower run, parallel thereto, of a second conveyor situated thereabove.

The containers are guided and pushed by adjustable abutment plates of these two conveyors.

When the container size is to be changed, it is necessary to change the mutual distance between the abutment plates of the lower conveyor in relation to the mutual distance between the abutment plates of the upper conveyor.

In the above mentioned conveyors, when the container size is to be changed, it is necessary to keep the machine on stand-by, so as to allow the specialized operators to perform required adjustments.

According to some more elaborate solutions, these adjustments are carried out automatically, yet this results in the necessity of suitable actuators controlled by a programmed control unit, which increases the conveyor production costs.

Moreover, these known conveyors are obviously complex.

SUMMARY OF THE INVENTION

The main object of the present invention is to propose a conveyor with a structure such that it can be used for a great number of container sizes without any adjustments or substitutions of parts and/or devices.

Another object of the present invention is to propose a conveyor that fulfills the above mentioned object, and whose working speed does not slow down the productivity of the stations and/or machines connected thereto.

Still another object of the present invention is to propose a conveyor which combines known techniques with simple devices.

The objects of the present invention become evident from the contents of the claims, in particular of the first claim, wherein there is claimed a conveyor for transporting containers through operative stations, in particular from a station, in which said containers are fed to the conveyor, to a station, in which said containers are downloaded from the conveyor, said conveyor including an endless belt mounted on relative wheels, a driving wheel and a driven wheel respectively, and moving in a forward direction, said conveyor being characterized in that it includes:

a series of equispaced recesses which are made on an outer surface of said belt, whit each said recess set in communication with a vacuum source when they are located in the upper run of the conveyor, so as to grip a base of a container located thereon;

a series of pads, with one of said pads provided for each recess and hinged with a lower part to the outer surface of the belt right behind the respective recess, with reference to said forward direction of the conveyor;

a series of connecting rods, each of said rods being pivoted at the top to a corresponding pad of said series of pads and at the bottom to the outer surface of the belt, behind said pad with reference to said forward direction, with each connecting rod having a length allowing to maintain said pad perpendicular to the belt when said pad and connecting rod are situated in the upper run, for receiving in abutment and pushing a rear wall of said container, said connecting rod having a length also allowing to set said pad in a rearward position with respect to the plane perpendicular to the belt and passing through the lower articulation point of said pad, with reference to said forward direction, when said pad and connecting rod are situated in the region of the belt which engages said driving and driven wheels.

BRIEF DESCRIPTION OF THE DRAWINGS

The characteristic features and advantages of the present invention will be pointed out in the following description of a preferred embodiment, with reference to the enclosed tables of drawings, in which.

BEST MODE OF CARRYING OUT THE INVENTION

Figure 1:
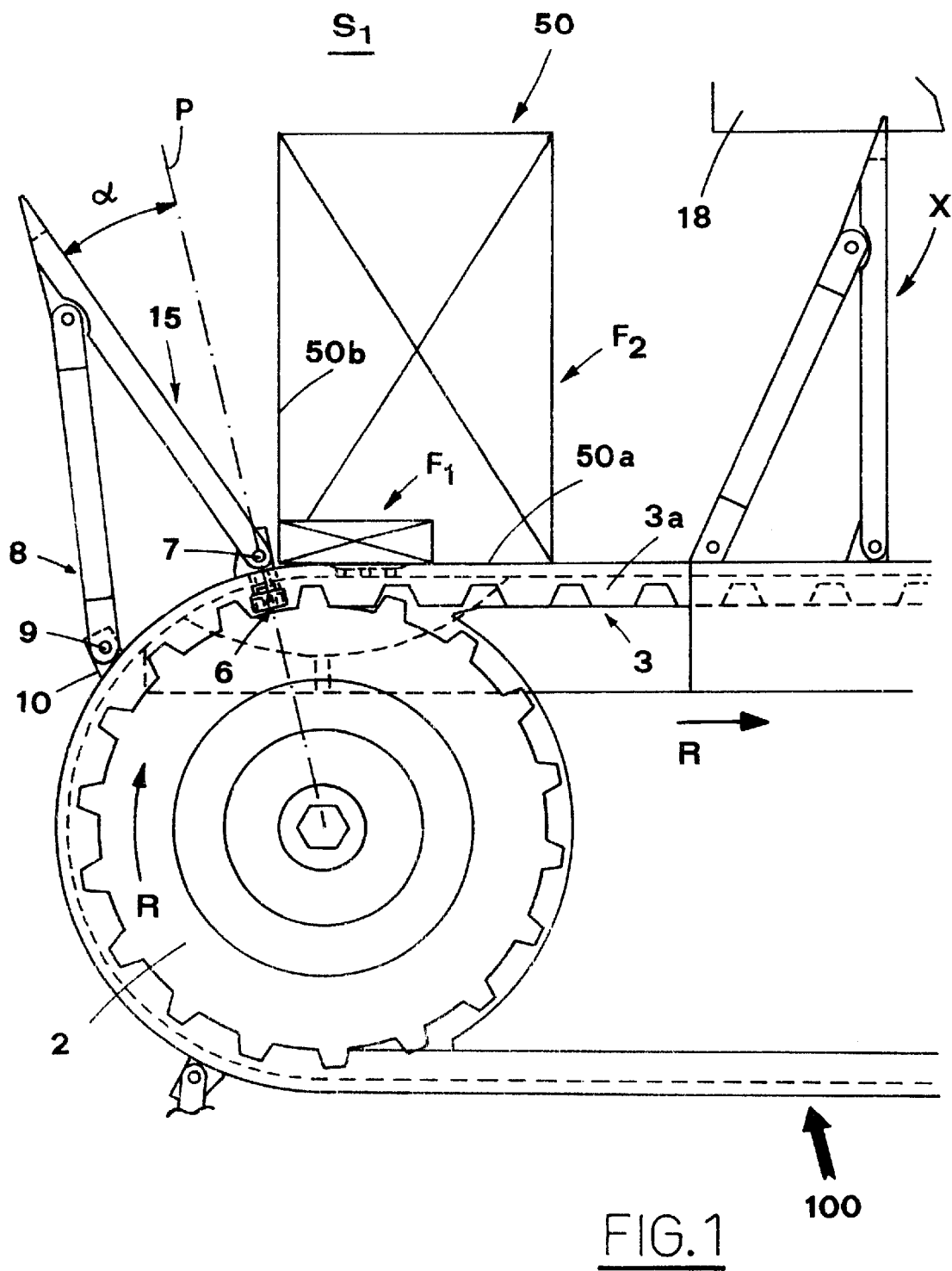
FIG. 1 is a schematic lateral view of the upper part of the proposed conveyor, in which two container sizes, minimum and maximum, respectively are schematically indicated.
Figure 2:
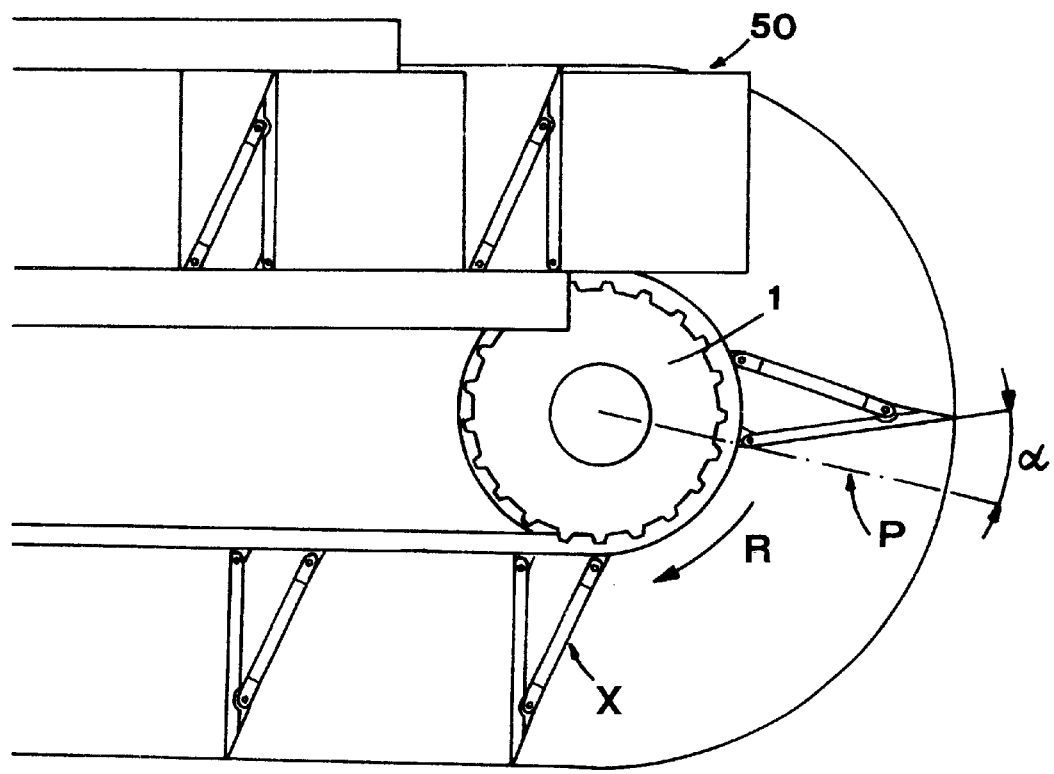
FIG. 2 is a schematic lateral view, in a different scale than the FIG. 1, of the lower part of the proposed conveyor, showing another container size, different from the previous one.
Figure 3:
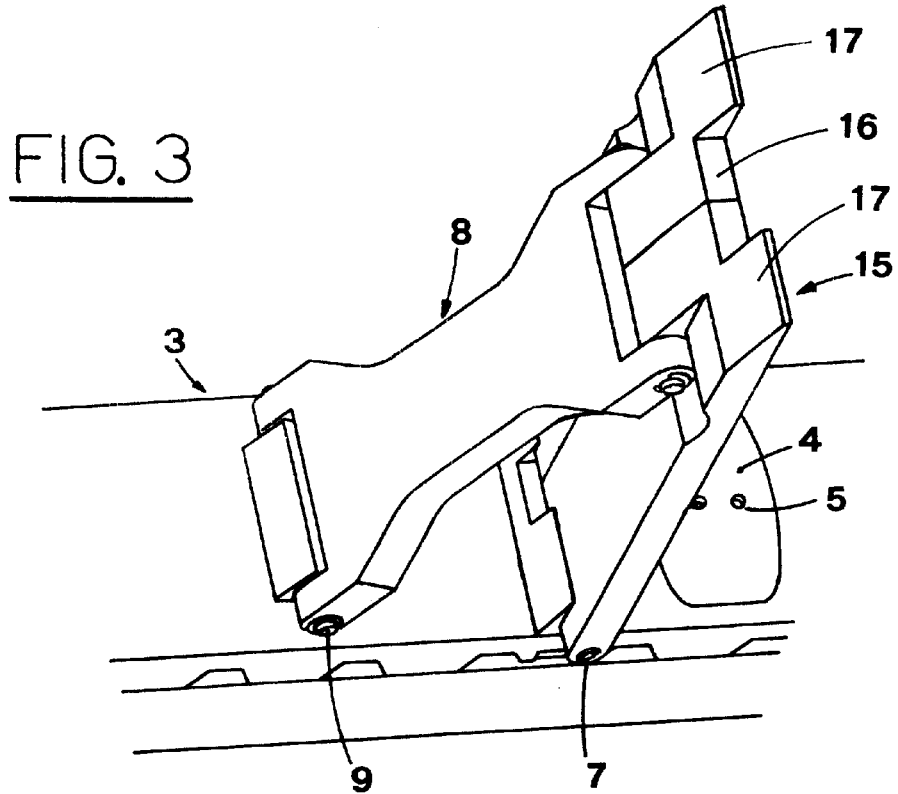
FIG. 3 is a prospective view of a particular indicated with X in FIGS. 1 and 2.

With reference to the above described figures, the reference numerals 1 and 2 indicate two toothed wheels, driving wheel and driven wheel respectively, on which a complementary endless toothed belt 3 is mounted, so as to define a conveyor 100.

The upper part of this conveyor is fed with open ended sleeve containers 50 already erected.

In the central part of the upper run 3a of the belt 3, these containers are closed at bottom, filled with suitable articles, and then closed at top by other, not shown, devices and according to techniques known to those skilled in the art.

The endless belt features equispaced recesses made on its outer surface. Each of these recesses can be set in communication with a vacuum source by related holes 5.

In particular, vacuum is applied to these recesses when they are located in the upper run 3a of the conveyor, according to known techniques.

Known fastening means 6 pass through the belt 3 right behind the recesses 4 with respect to the movement direction R; according to another embodiment, these fastening means are made integral with the belt.

The portion of these fastening means protruding outwards from the belt, features a hinge pin 7, to which a corresponding pad 15 is pivoted.

A connecting rod 8 is pivoted at the top of each pad 15.

The other, lower end of the connecting rod 8 is articulated, by a hinge pin 9, to a block 10, e.g. integral with the belt and situated behind the corresponding pad, as shown in the enclosed figures.

Otherwise, the hinge pin 9 can be supported by means fastened to the belt.

The length of the connecting rod 8 allows the pad 15 to be maintained in vertical position, when both fastening means 6 and the block 10 are located in the upper and lower run, in particular in the upper run, which is active, as will be explained later.

The upper part of the pad 15 forms a rectangular indentation 16, which is symmetrical to the pad symmetry plane and from which two wings 17 extend.

This indentation 16 allows to avoid interference between the pad 15 and a longitudinal abutment 18 situated over the central part of the upper run 3a.

The pads 15 of these parts of the belt, which are located on the toothed wheels 1, 2, are inclined backward by a predetermined angle α, with reference to the conveyor movement direction R and with respect to a plane P perpendicular to the belt and passing through the hinge 7 axis.

This is advantageous because it allows to reduce the space necessary for the pads to pass in the curved parts of their paths, but mainly for the following technical-practical reasons.

FIG. 1 shows a station S1, which feeds sleeve containers to the conveyor 100, more precisely to the rear end of its upper run 3a.

The pad 15 is withdrawn with respect to the plane P, which facilitates the positioning of the container 50 on the upper run 3a, more precisely, in the region of the recess 4 and close to the hinge 7.

Application of suction to the recess 4 removably fastens the base 50a, and therefore the container 50, to the belt 3.

The sleeve configuration of the container is kept by the pad 15, which receives in abutment the vertical rear wall 50b of the container 50 and which, consequently, reacts efficiently to the inertial effect, which could turn the container backwards.

Consequently, the container is pushed by the combined action of the suction applied to the base 50a of the container and the abutment-pushing action of the pad on the relative vertical wall 50b.

The container 50, filled and closed, is downloaded from the conveyor at the end of the upper run 3a.

This downloading is facilitated by the fact that the pad 15 relative to this container is gradually inclined backwards with respect to the perpendicular plane P, and consequently, is disengaged from this container, in time relation with the disconnection of the relative recess 4 from the source of vacuum, as soon as the fastening means 6 of this pad go beyond the radial line of the driving wheel, which is perpendicular to the plane defined by the upper run 3a.

Suitable means, not shown, move the container 50 away from the conveyor in known way.

The proposed conveyor can be used for containers of many sizes without operator's intervention in order to substitute parts or adjust means; this is illustrated in FIG. 1, which indicates, as example, two extreme sizes F1, F2 of a possible size scale.

In all sizes of this scale, the container is pushed due to the combined effect of suction and abutment—pushing action of the pad, independently from the speed of the upper run 3a.

Another extremely advantageous feature of the invention results from the fact that mutual proportions in dimensioning of the pad 15 and connecting rod 8 facilitate feeding the sleeve containers to the upper run 3a, downloading filled and closed containers from this upper run 3a, and reduces the conveyor dimension in the region of the wheels 1, 2.

This results in the possibility of keeping devices cooperating with the conveyor closer to its heads, which brings to a reduction of the dimensions of the whole machine, to which the proposed conveyor is connected.

The proposed conveyor is obtained by an original combination of known techniques, such as setting the recesses 4 in communication with the vacuum source, and by simple devices, such as pads 15, connecting rods 8, fastening means 6.

It is understood that what above has been described as a mere, non limitative example, therefore possible constructive variants remain within the protective scope of the present technical solution, as described above and claimed in the following.

What is claimed is:

1. A conveyor for transporting containers through operative stations, in particular from a station, in which said containers are fed to the conveyor, to a station, in which said containers are downloaded from the conveyor, said conveyor (100) including an endless belt (3) mounted on relative wheels (1,2), driving wheel and driven wheel respectively, and moving in a forward direction (R), said conveyor being characterized in that it includes:

a series of equispaced recesses (4) which are made on an outer surface of said belt, with each said recess set in communication with a vacuum source when they are located in the upper run (3) of the conveyor, so as to grip a base (50a) of a container (50) located thereon;

a series of pads (15), with one of said pads provided for each recess (4) and hinged with a lower part to the outer surface of the belt right behind the respective recess (4), with reference to said forward direction (R) of the conveyor;

a series of connecting rods (8), each of said rods being pivoted at the top to a corresponding pad (15) of said series of pads and at the bottom to the outer surface of the belt, behind said pad with reference to said forward direction (R), with each connecting rod having a length allowing to maintain said pad (15) perpendicular to the belt (3) when said pad (15) and connecting rod (8) are situated in the upper run, for receiving in abutment and pushing a rear wall (50b) of said container (50), said connecting rod having a length also allowing to set said pad in a rearward position with respect to the plane (P) perpendicular to the belt and passing through the lower articulation point of said pad, with reference to said forward direction (R), when said pad (15) and connecting rod (8) are situated in the region of the belt which engages said driving and driven wheels.

2. A conveyor according to claim 1, wherein each pad (15) is articulated to the outer surface of the belt by fastening means (6), which pass through the belt (3) behind the recess related to said pad, with a hinge pin (7) situated in the lower end of the pad and in this portion of said fastening means (6) which protrudes outwards from the belt.

3. Conveyor, according to claim 1, wherein a lower end of each said connecting rod (8) is articulated to the outer surface of said belt by a block (10), made integral with said belt, and a hinge pin (9), which passes through said block (10) and said lower end of the connecting rod.

4. Conveyor, according to claim 1, wherein each pad (15) features an indentation at its upper part, which is symmetrical to a symmetry plane of said pad.

* * * * *